United States Patent [19]

Kozono et al.

[11] Patent Number: 4,561,114
[45] Date of Patent: Dec. 24, 1985

[54] COCHANNEL INTERFERENCE MEASUREMENT SYSTEM

[75] Inventors: Shigeru Kozono, Kanagawa; Keiichi Ishikawa, Nigata, both of Japan

[73] Assignee: Nippon Telegraph & Telephone Public Corporation, Tokyo, Japan

[21] Appl. No.: 541,842

[22] Filed: Oct. 14, 1983

[30] Foreign Application Priority Data

Feb. 8, 1983 [JP] Japan .................................. 58-18102
Apr. 20, 1983 [JP] Japan .................................. 58-68428

[51] Int. Cl.$^4$ .......................................... H04B 17/00
[52] U.S. Cl. .................................. 455/226; 324/57 N
[58] Field of Search .................. 455/65, 67, 212, 213, 455/226, 205, 206, 303; 375/102; 324/57 N

[56] References Cited

U.S. PATENT DOCUMENTS

4,085,370 4/1978 Van Der Poel et al. .
4,124,818 11/1978 Lin et al. ............................ 455/226

Primary Examiner—Marc E. Bookbinder
Attorney, Agent, or Firm—Armstrong, Nikaido, Marmelstein & Kubovcik

[57] ABSTRACT

In radio communication system using angular modulation, the presence and quantity of cochannel interference is detected. According to the invention, when desired signal and undesired signal are received simultaneously, an envelope of the received IF output signal involves low frequency spectrum component similar to that of fading and high frequency spectrum component with several KHz. The low frequency spectrum component and high frequency spectrum component are then calculated, and the interference ratio D/U is obtained by processing said components.

6 Claims, 12 Drawing Figures

COCHANNEL INTERFERENCE MEASUREMENT SYSTEM

BACKGROUND OF THE INVENTION

The present invention relates to a cochannel interference detection system in radio communicatins. The present invention is applicable to a mobile communication, and/or cordless telephone and other radio communication systems. The present invention is applicable to the radio communication system using an angle modulation system (FM or PM).

One of the prior systems for detecting cochannel interference uses a pilot signal for detecting interference. In this system, a transmitter transmits power modulated by a pilot frequency which is set outside of the baseband, and the frequency of the pilot is different for each zone. When a receiver receives a pilot signal which is assigned to another zone, it is judged that there is an interference. However, that system has the disadvantages that the baseband spectrum is spread, the structure of the system is complicated (a transmitter must have a pilot signal generator, and a receiver must have a pilot signal receiver), and it can only detect an interference when D/U (ratio of desired signal to undesired signal) is smaller than several dB.

Additional prior interference detection equipment is shown in U.S. Pat. No. 4,085,370 which uses noise in a baseband generated by interference. This system can operate correctly only when the reception level does not widely vary and the modulation index is almost constant. However, it can not detect the average of the D/U ratio.

Further, prior interference detection systems have the disadvantage that they can merely detect the presence of interference, they can not measure the quantity of interference. Therefore, when communication quality becomes poor becouse of interference, the automatic switching has been almost impossible.

SUMMARY OF THE INVENTION

It is an object, therefore, of the present invention to overcome the disadvantages and limitations of a prior interference detection system by providing a new and improved interference detectin system.

It is also an object of the present invention to provide an interference detection system which can measure interference during actual communication without taking a particular test period.

It is also an object of the present invention to provide an interference detection system which can measure the quantity of interference.

The above and other objects are attained by a co-channel interference measurement system in radio communication using angular modulation comprising; envelope detection means for envelope detection of both first signal and second signal; low frequency spectrum component detection means for detecting a low frequency spectrum component having the similar spectrum as that of fading spectrum frequency, and said low frequency spectrum component relating to sum of first signal and second signal; high frequency spectrum component detection means for detecting a high frequency spectrum component higher than a fading spectrum frequency, said high frequency spectrum component relating to product of first signal and second signal; means for providing ratio of said low frequency spectrum component to said high frequency spectrum component; and indication means for indicating interference by ratio of first signal to second signal according to said ratio of said low frequency spectrum component to said high frequency spectrum component.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The theoretical principle of the present invention is first described.

It is supposed that a first desired signal $e_1$ which is angular modulated, and a second undesired signal $e_2$ which is also angular modulated are expressed by the equations (1) and (2), respectively.

Desired signal;

$$e_1 = E_1(t) \sin(\omega_1 t + (\Delta\omega_1)/(P_1) \sin P_1 t) \quad (1)$$

Undesired signal;

$$e_2 = E_2(t) \sin(\omega_2 t + \phi + ((\Delta\omega_2)/(P_2))\sin(P_2 t + \theta)) \quad (2)$$

where $E_1(t)$ and $E_2(t)$ are the amplitudes of the desired signal and the undesired signal, respectively, and it is assumed that they are in Rayleigh distribution. The $\omega_1$ and $\omega_2$ are the angular velocity of the desired wave and the undesired wave, respectively, and $\Delta\omega_1$ and $\Delta\omega_2$ are the frequency shifts of the desired wave and the undesired wave by a modulation signal, respectively. $P_1$ and the $P_2$ are the frequencies of the modulation signals of the desired signal and the undesired signal, respectively. $\phi$ is the phase difference between the desired wave and the undesired wave, and $\theta$ is the phase difference between the desired modulation signal and the undesired modulation signal.

When both the desired wave and the undesired wave are received by a receiver, the combined signal e is expressed by the equation (3).

$$e = e_1 + e_2 = \qquad (3)$$
$$[E_1^2(t) + E_2^2(t) + 2E_1(t)E_2(t)\cos(\psi(t))]^{\frac{1}{2}} \times$$
$$\sin[\omega_1 t + ((\Delta\omega_1)/(P_1))\sin P_1 t +$$
$$\tan^{-1}((\Lambda\sin(\psi(t))/(1 + \Lambda\cos(\psi(t)))]$$
$$\text{where } \psi(t) = (\omega_2 - \omega_1)t + \emptyset + \qquad (4)$$
$$((\Delta\omega_2)/P_2)\sin(P_2 t + \theta) - ((\Delta\omega_1)/P_1)\sin P_1 t$$
$$\Lambda = E_1/E_2 \qquad (5)$$

The envelope output of the square-detector of e is expressed by the equation (6).

$$R(t) = E_1^2(t) + E_2^2(t) + 2E_1(t)E_2(t)\cos(\psi(t)) \qquad (6)$$

Figure 1:
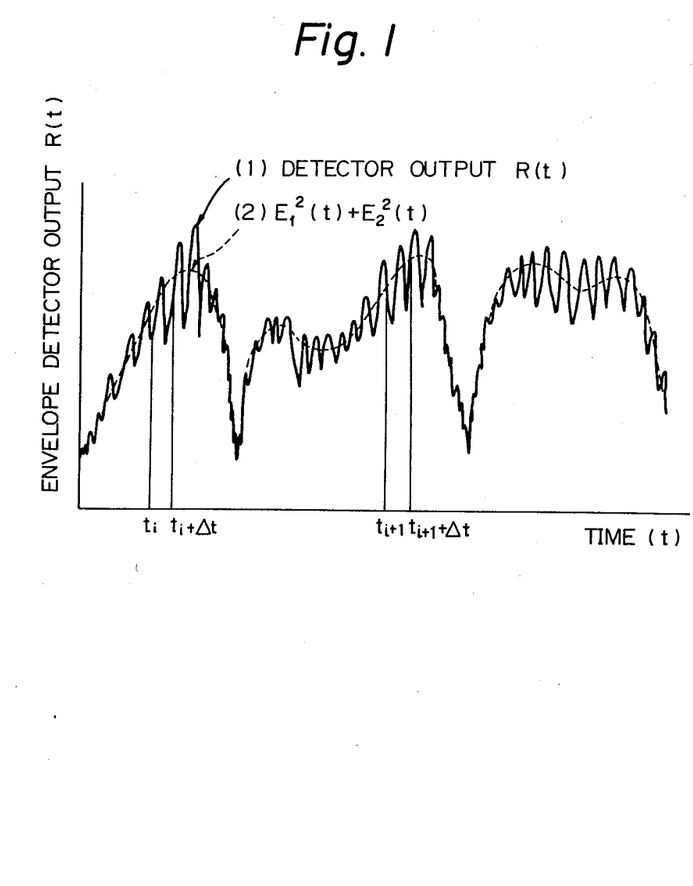
FIG. 1 shows waveforms of output of an envelope detector.

FIG. 1 shows an example of the envelope output R(t), in which the curve (1) shows the envelope R(t), and the curve (2) shows the value $E_1^2(t) + E_2^2(t)$ which is the low frequency spectrum component of the envelope output R(t). It nearly equals to the fading frequency which depends upon the velocity of a mobile, and the wavelength of electromagnetic wave. When a mobile moves at 40 Km/hour, and the carrier frequency is 900 MHz, said low frequency component is about 30 Hz. The $2E_1(t)E_2(t)\cos(\psi(t))$ in the equation (6) has the high frequency spectrum higher than Rayleigh fading frequency. That high frequency component is generated by the angular modulation, or the small difference of the carrier frequencies between the desired signal and the undesired signal.

According to the preferred embodiment of the present invention, the average of the low frequency component $<E_1^2(t) + E_2^2(t)>$ and the average of the high frequency spectrum component $<E_1(t)E_2(t)>$ are measured by using an analog-digital converter, and then, the D/U is calculated by using said two average values.

The analog-digital converter samples the input signal at the time (t) and the time (t+$\Delta$t) as shown in FIG. 1. The sampled values R(t) and R(t+$\Delta$t) at the time (t) and (t+$\Delta$t) are expressed by the equation (7).

$$R(t) = E_1^2 + E_2^2 + 2E_1 E_2 \cos(\psi)$$
$$R(t+\Delta t) = E_{1\Delta}^2 + E_{2\Delta}^2 + 2E_{2\Delta}E_{2\Delta}\cos(\psi_\Delta) \qquad (7)$$

First, the average of low frequency component value is calculated as follows. It is assumed that the average $<\cos(\psi)=0>$ when the reception signal is angular modulated and/or the sampling period is at random. Therefore, the average of the low frequency spectrum component value is obtained by taking a plurality of samples, as follows.

$$<R(t)> = (1/N) \sum_{i=1}^{N} R_i(t) \qquad (8)$$
$$= <E_1^2> + <E_2^2> = X$$

where $<\ >$ shows the average, and N is sample number.

Next, the average of high frequency spectrum component value Y is explained. The equation (9) is expressed by taking the average of the square of the difference between R(t) and R(t+$\Delta$t).

$$<(R(t) - R(t+\Delta t))^2> = (1/N)\sum_{i=1}^{N}(R_i(t) - R_i(t+\Delta t))^2 \qquad (9)$$

-continued
$$= <[(E_1^2 - E_{1\Delta}^2 + E_2^2 - E_{2\Delta}^2) +$$
$$2(E_1 E_2 \cos(\psi) - E_{1\Delta}E_{2\Delta}\cos(\psi_\Delta))]^2>$$

The sampling delay time $\Delta t$ is selected so that the equation (10) is satisfied for $E_1$ and $E_2$ which vary according to Rayleigh fading, and the equation (11) is satisfied for $\cos(\psi)$, and $\cos(\psi_\Delta)$ which varies quickly.

$$E_1 \approx E_{1\Delta}, \; E_2 \approx E_{2\Delta} \qquad (10)$$

$$<\cos(\psi)\cos(\psi_\Delta)> \approx 0 \qquad (11)$$

The equation (11) means that $\cos(\psi)$ has no correlation with $\cos(\psi_\Delta)$. Then, the equation (9) is changed to the equation (12).

$$<[R(t) - R(t+\Delta t)]^2> = 4<E_1^2><E_2^2> = Y \qquad (12)$$

Setting $$(\Gamma) = (D/U) = <E_1^2>/<E_2^2> \qquad (13)$$

the equation (14) is derived from the equations (8), (12) and (13).

$$(\Gamma)^2 - 2K(\Gamma) + 1 = 0 \qquad (14)$$

Then, $$(\Gamma) = K + \sqrt{K^2 - 1} \qquad (15)$$

where $$K = (2X^2/Y) - 1 = (<E_1^2> + <E_2^2>)/(2<E_1^2><E_2^2>) \qquad (16)$$

Since K is equal to or larger than 1, the value of the equation (15) is a real number, from which may be calculated the interference value ($\Gamma$).

Next, the delay time $\Delta t$ is considered.

It should be noted that the equation (14) is met under the condition that the equations (10) and (11) are satisfied. Therefore, when those equations (10) and (11) are not satisfied, the interference value ($\Gamma$) has an error, which is analyzed below.

It is assumed that the following conditions are satisfied, and it should be noted that those conditions are naturally satisfied in a mobile communication.

(1) $E_1$ and $E_2$ distribute in Rayleigh distribution, and are independent from each other.
(2) the amplitude $E_1$ and $E_2$ and the phase ($\psi$) are independent from one another.
(3) $<\cos(\psi)> \approx 0 \cdot \omega_1 = \omega_2$, and $\emptyset = \emptyset_\Delta$ \qquad (17)

It is quite clear from the equation (8) that $X = <R(t)>$ does not depend upon $\Delta t$.

The value Y depends upon $\Delta t$, and the value Y' with the influence of $\Delta t$ is expressed by the equation (18).

$$Y' = <(R(t) - R(t - \Delta t))^2> \qquad (18)$$
$$= <Z^2> + 4<E_1^2><E_2^2>(1 - 2<\cos(\psi)\cos(\psi_\Delta)>)$$
where $Z = E_1^2 - E_{1\Delta}^2 + E_2^2 - E_{2\Delta}^2$ In comparing Y expressed by the equation (12) with no influence of $\Delta t$ with Y' expressed by the equation (18) with the influence of $\Delta t$, it should be noted that Y' has the additional terms $<Z^2>$, and $-8<E_1^2><E_2^2><\cos(\psi)\cos(\psi_\Delta)>$.

(a) When $\Delta t$ is large;

In this case, $<\cos(\psi)\cos(\psi_\Delta)> \approx 0$ is satisfied, and the equation (18) becomes;

$$Y' = <Z^2> + 4<E_1^2><E_2^2> \quad (19)$$

where $<Z^2>$ is expressed by the equation (20).

$$<Z^2> = 8b_2^2[\Gamma^2(1-\rho_1^2)+(1-\rho_2^2)] \quad (20)$$

where $b_2^2 = <E_{24}>/8$, and $(\rho)$ is an auto correlation as follows.

$$(\rho) = J_0(2\pi f_m \Delta t) \quad (21)$$

where $f_m$ is the fading frequency ($f_m = v$(velocity)/$\lambda$-(wavelength), and $J_0$ is the Bessel function of zero'th order. The equation (21) shows that Y is influenced by the product of $\Delta t$ and $f_m$.

Figure 2:
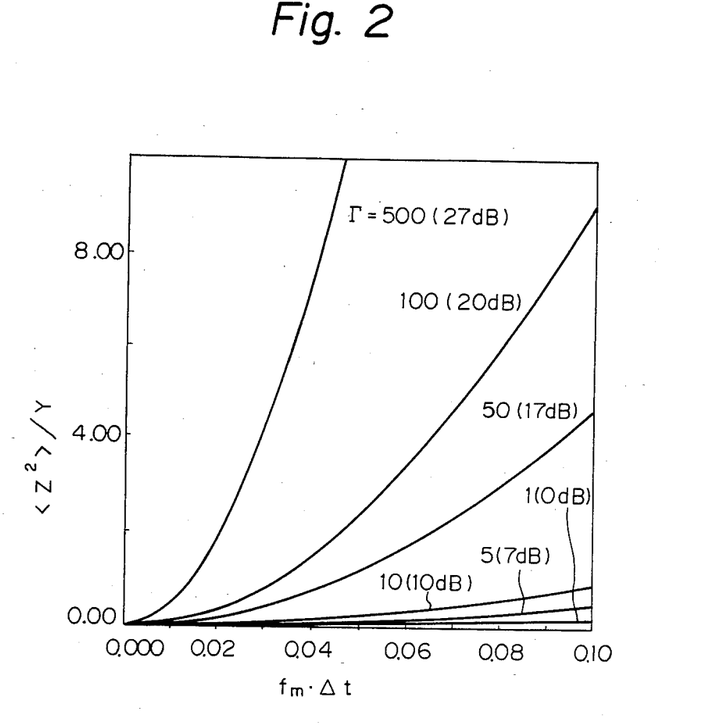
FIG. 2 shows curves of the relation between $f_m \Delta t$ and $Z^2/Y$.

FIG. 2 shows the curves of $<Z^2>/Y$. The influence of $f_m\Delta t$ depends upon the value ($\Gamma$), and the larger the value ($\Gamma$) is, the larger the influence is.

Figure 3:
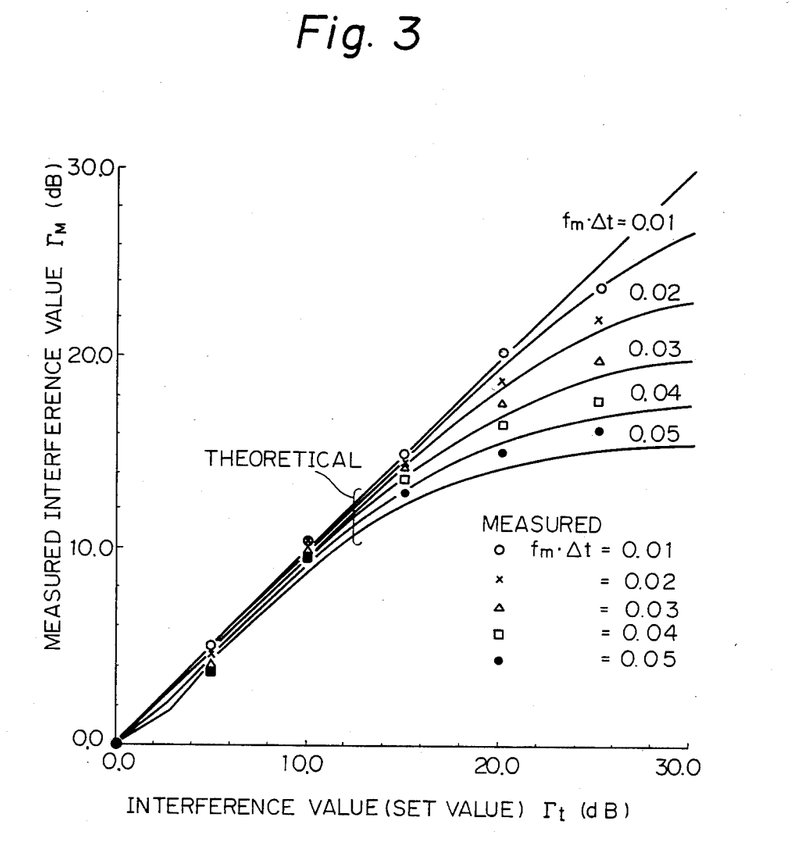
FIG. 3 shows curves of the error of the measured interference when the delay time $\Delta t$ is large.

FIG. 3 shows the curves of the influence of $f_m\Delta t$ to ($\Gamma$), in which the horizontal axis shows the true (set) value of $D/U=(\Gamma_t)$, and the vertical axis shows the measured value $D/U=(\Gamma_M)$. The solid lines in FIG. 3 are theoretically calculated value, and the dots show the measured values. It should be noted that the ideal line in FIG. 3 is the 45° line which has no error. The value ($\Gamma_M$) becomes theoretically and experimentally smaller than the value ($\Gamma_t$) when $f_m\Delta t$ is large, and the error is large when ($\Gamma_t$) is large. It should be appreciated in FIG. 3 that the value $f_m\Delta t$ must be less than 0.03 because the error becomes less than 1 dB when ($\Gamma_t$) is smaller than 15 dB. In FIG. 3, $\rho_1=\rho_2$ is assumed.

(b) When $\Delta t$ is small;

In this case, the equation (10) is satisfied, and Y' becomes $$Y' = 4<E_2^2><E_2^2>(1-2<\cos(\psi)\cos(\psi_{66})>) \quad (22)$$

where the value $<\cos(\psi)\cos(\psi_\Delta)>$ is expressed by the equation (23).

$$<\cos(\psi)\cos(\psi_\Delta)> = \tfrac{1}{2}J_0(Z_1)J_0(Z_2) + \quad (23)$$

$$\Sigma \ [\cos(2n\theta_2 - 2m\theta_1)J_{2n}(Z_2)J_{2m}(Z_1)] -$$

$$\Sigma \ [\cos((2n+1)\theta_2 - (2m+1)\theta_1)J_{2n+1}(Z_2)J_{2m+1}(Z_1)]$$

where J shows the Bessel function, $\theta_1 = \tan^{-1}(\sin P_1\Delta t/(\cos P_1\Delta t - 1))$
$\theta_2 = \tan^{-1}((\sin(\theta) - \sin(P_2 t + \theta))/(\cos\theta - \cos(P_2\Delta t + \theta)))$ $Z_1 = \sqrt{2(1 - \cos P_1 \Delta t)} \ \Delta\omega_1/P_1$ $Z_2 = \sqrt{2(1 - \cos P_2 t)} \ \Delta\omega_2/P_2$ The second term and the third term become effective only when $nP_2=mP_1$, and $((2n+1)P_2=(2m+1)P_1$, respectively are satisfied by proper integers m and n ($m=n\approx 0$).

Figure 4:
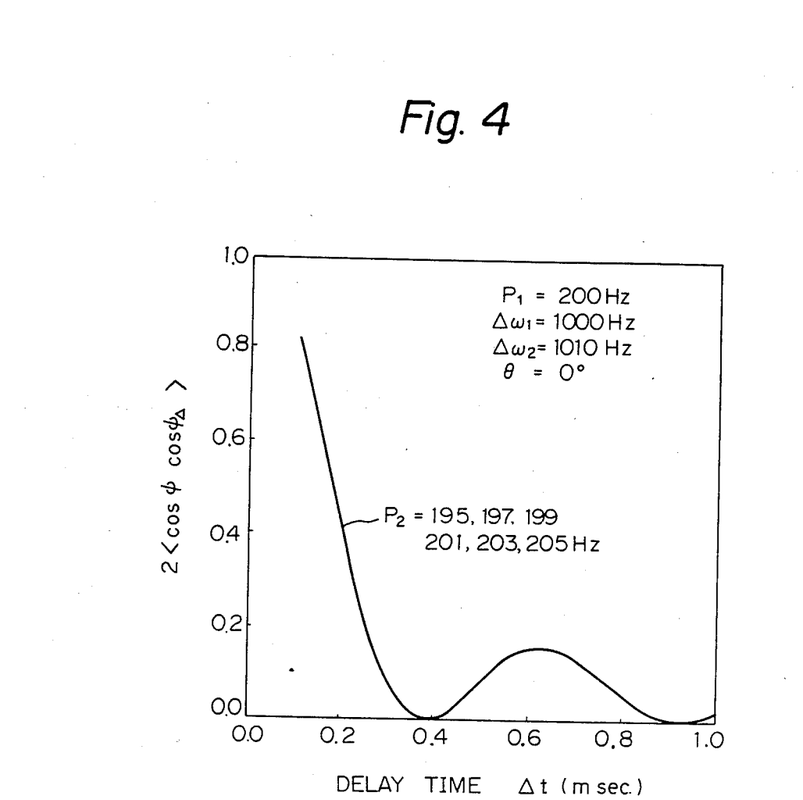
FIG. 4 shows curves between the delay time $\Delta t$ and the average of $\cos(\psi)\cos(\psi_\Delta)$.

FIG. 4 shows the relation between $2<\cos(\psi)\cos(\psi_{66})>$ (vertical axis), and the delay time $\Delta t$ (horizontal axis), in which $\Delta\omega_1=1000$ Hz, $\Delta\omega_2=1010$ Hz, the modulation signal is a sine wave signal, $P_1=200$ Hz, and $P_2$ is in the range between 195 Hz and 205 Hz. It should be noted in FIG. 4 that the value $2<\cos(\psi)\cos(\psi_\Delta)>$ decreases with the increase of $\Delta t$, but it does not depend upon modulation frequency $P_2$. The value becomes nearly zero when $\Delta t=0.4$ msec, and after that, it decreases while vibrating.

It should be noted that $2<\cos(\psi)\cos(\psi_\Delta)>$ is substantially zero when $\Delta t$ is larger than 0.4 msec, therefore, it is preferably that $\Delta t$ is larger than 0.4 msec.

The value $2<\cos(\psi)\cos(\psi_\Delta)>$ shows the decrease from the value Y when $\Delta t$ is small, as shown in the equation (18).

Figure 5:
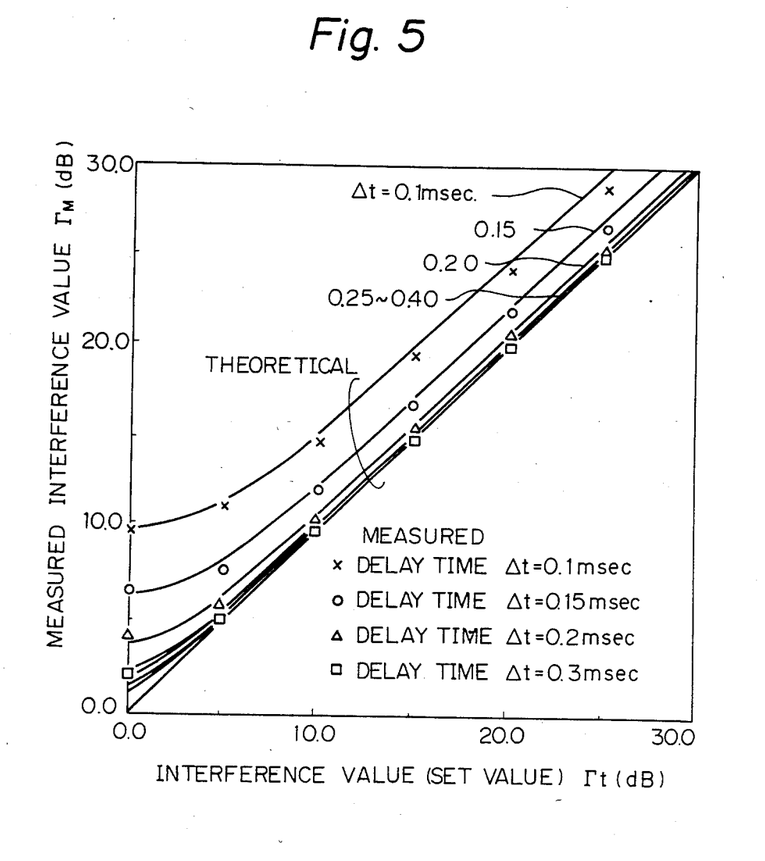
FIG. 5 shows curves of the error of the measured interference when the delay time $\Delta t$ is small.

FIG. 5 shows the influence of $\Delta t$ to the value ($\Gamma_M$) under the conditions of FIG. 4. When the value $\Delta t$ is small, the value ($\Gamma_M$) becomes large, and thus the influence is large when ($\Gamma_t$) is large. The reason why ($\Gamma_M$) becomes large, is that Y becomes small when $\Delta t$ is small.

Figure 6:
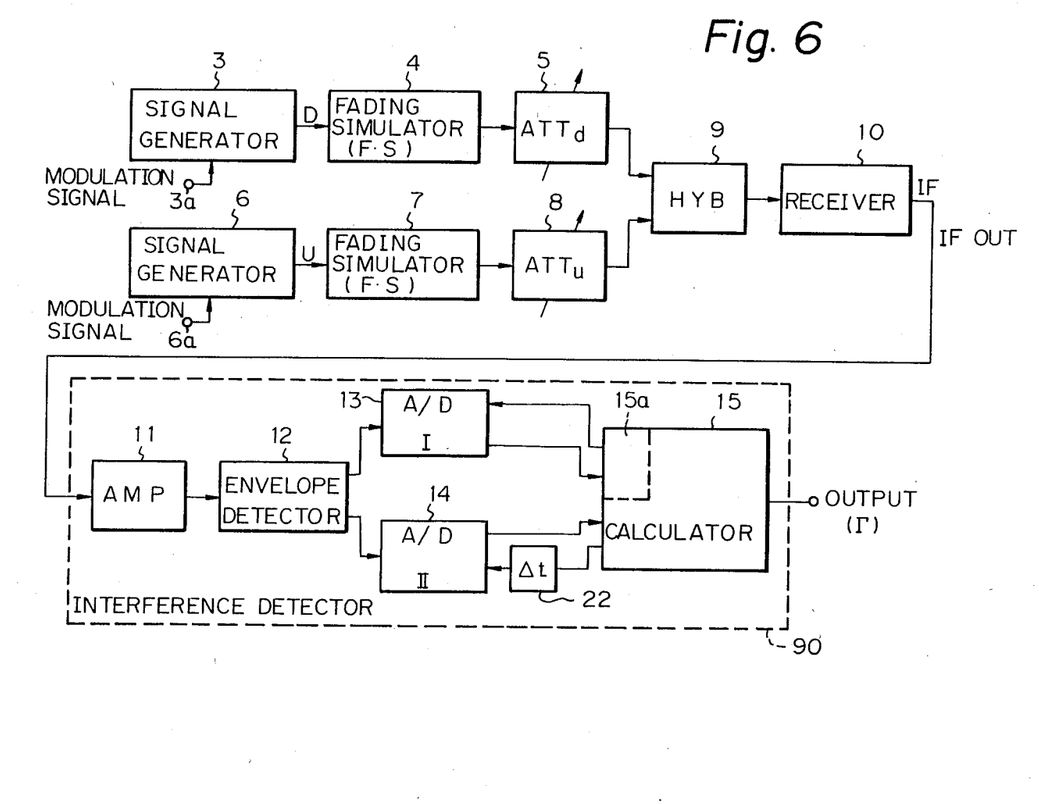
FIG. 6 shows the block diagram of an embodiment of the interference detection system according to the present invention.

FIG. 6 shows a block diagram of an embodiment of the present invention, in which the upper portion shows the experimental unit for testing the present apparatus, and the lower portion 90 enclosed by a dotted line is the present interference detector. In the figure, reference numeral 3 is an oscillator for the generating a desired signal (D), which is angular-modulated by the modulation signal on the terminal 3a. Oscillator 6 generates undesired signal (U), which is also angular-modulated by the modulation signal on the terminal 6a. Fading simulators 4 and 7 provide artificial fading to both the desired signal (D) and the undesired signal (U), and 5 and 8 are variable attenuators. Combiner 9 combines both the desired signal (D) and the undesired signal (U), and 10 is a receiver which provides the intermediate frequency output (IF OUT). The IF OUT signal is applied to the present interference detector 90, which has an amplifier 11, an envelope detector 12, a pair of analog-digital converters 13 and 14, a processor 15 and a delay circuit 22. Preferably, the amplifier 11 is a logarithmic amplifier, and the corresponding logarithmic expander 15a is inserted at the input portion of the processor 15 so that signal processed by the envelope detector 12 and converter 13 and/or 14 has a small dynamic range.

Figure 7A:
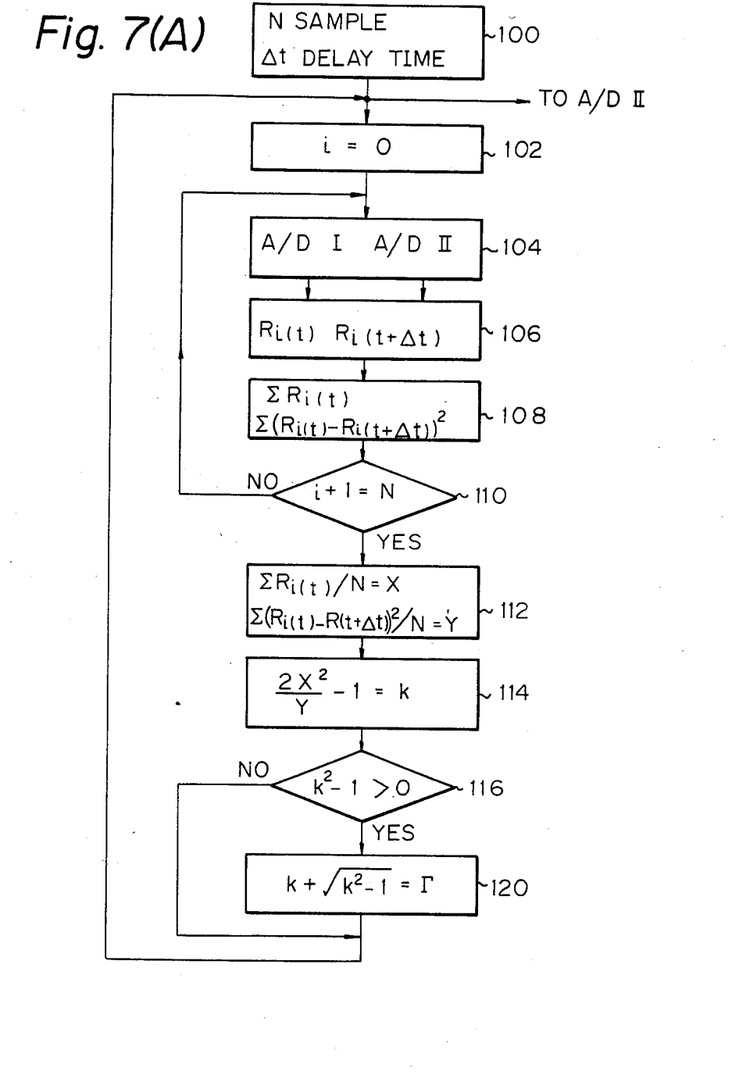
FIG. 7A is a flow chart showing the operation of the apparatus of FIG. 6.
Figure 7B:
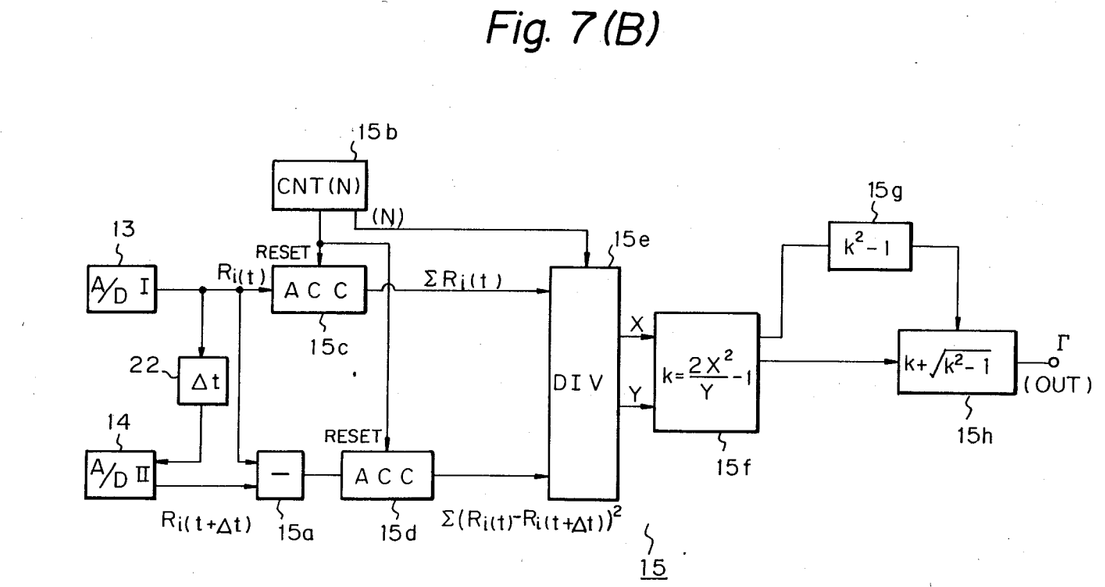
FIG. 7B is a detailed block diagram of the calculator 15 of FIG. 6.

FIG. 7A shows a flow-chart of the processor 15 when the processor 15 is implemented by a programmed computer, and FIG. 7B shows a block diagram of the processor 15 when the processor is implemented by hardware. First, the sampling number N is set in the counter 15b (FIG. 7B, box 100 in FIG. 7A). The number N is usually 500–1000 in case of Rayleigh fading. The delay time $\Delta t$ is also set and the value $\Delta t$ is applied to the delay circuit 22 which delays the sampling trigger signal by $\Delta t$. Then, the first A/D converter 13 provides the signal value $R_i(t)$ sampled at the time (t), and the second converter 14 provides the signal value $R_i(t+\Delta t)$ sampled at the time $(t+\Delta t)$. The accumulators (15c, 15d in FIG. 7B, box 108 in FIG. 7A) provide the sum of the sampled values, and the square of the difference of the two samples ($R_i(t)$ and $R_i(t+\Delta t)$), respectively. It should be noted that the accumulators 15c and 15d, or the box 108 in FIG. 7A are reset to zero in each initial condition ($i=0$).

When the above accumulation is repeated by N times, the division is carried out by the divider 15e in FIG. 7B, or the box 112 in FIG. 7A, which divides the input value by N to provide the value X and Y in the previous equations (8) and (12). Then, the calculator 15f in FIG.

7B or the box 114 in FIG. 7A provides the value $k$ ($=(2X^2/Y-1)$) according to the equation (16).

The calculator 15g in FIG. 7B or the box 116 in FIG. 7A calculates the value ($k^2-1$) in order to assure that said value ($k^2-1$) is positive. If that value ($k^2-1$) is negative, the present system is reinitialized, and the above operation is carried out again. When said value ($k^2-1$) is zero or positive, the calculator 15h in FIG. 7B or the box 120 in FIG. 7A calculates the value $$(k + \sqrt{K^2 - 1})$$

which is the resultant interference.

Figure 8:
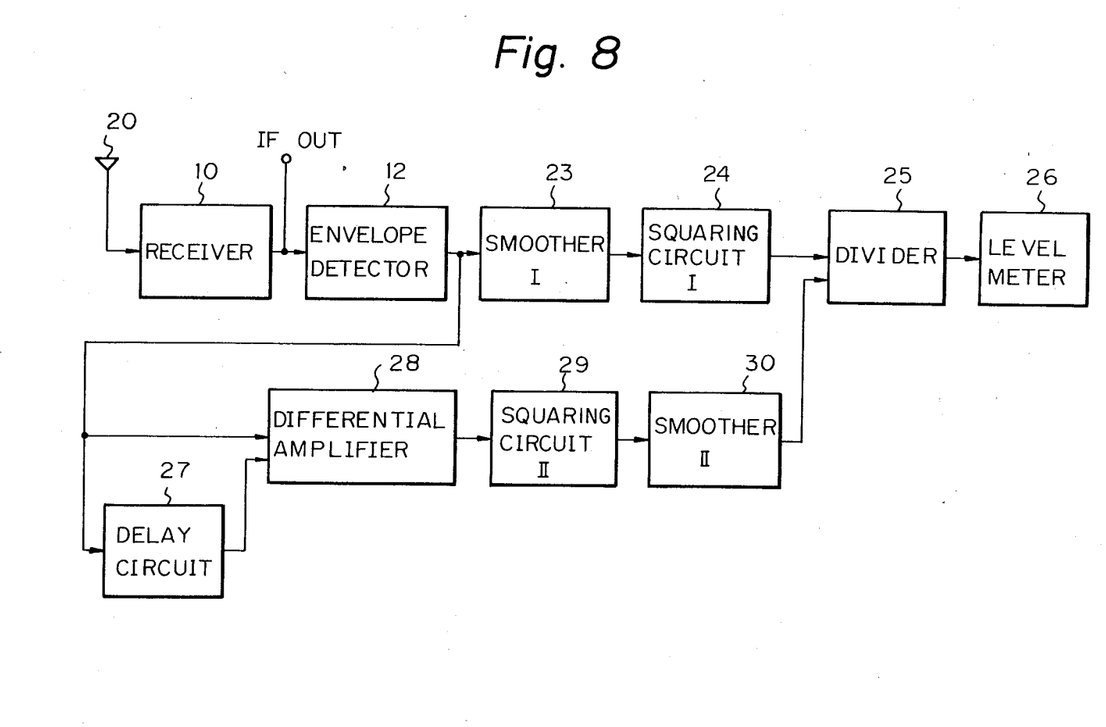
FIG. 8 is a block diagram of another embodiment of the interference detection system according to the present invention.

FIG. 8 shows another embodiment of the present invention, in which the calculation is accomplished by hardware without using a programmed means. In the figure, the reference numeral 20 is an antenna, 10 is a receiver, 12 is an envelope detector, 23 is a smoother circuit, 24 is a squaring circuit, 25 is a divider circuit, 26 is a level meter, 27 is a delay circuit, 28 is a differential amplifier, 29 is a square circuit, and 30 is a smoother circuit.

In FIG. 8, both the desired signal (D) and the undesired signal (U) enter into the receiver 10 through the antenna 20. At the output of the receiver 10, the intermediate frequency output (IF$_{out}$) is applied to the envelope detector 12. The output of the detector 12 is applied to the smoother 23, which, then, flattens the high frequency component of the envelope detected signal, therefore, that smoother 23 provides the low frequency component X expressed by the equation (8). Then, the squaring circuit 24 provides the square $X^2$, as follows.

$$X^2 = (<E_1^2> + <E_2^2>)^2 \quad (24)$$
$$= <E_1^2>^2 + 2<E_2^2><E_2^2> + <E_2^2>^2$$

The output of the detector 12 is also applied to the delay circuit 27, which delays the signal by the time $\Delta t$. The delayed signal and the non-delayed signal are applied to the differential amplifier 28, the output of which is applied to the squaring circuit 29. The output of the squaring circuit 29 is smoothed by the smoother 30. Accordingly, the output of the smoother 30 is the high frequency component Y of the equation (12). The output of the divider 25 is the ratio of the low frequency component $X^2$ and the high frequency component Y as shown in the equation (25).

$$Z = \frac{<E_1^2>^2 + 2<E_1^2><E_2^2> + <E_2^2>^2}{4<E_1^2><E_2^2>} \quad (25)$$

$$= \tfrac{1}{4}(\Gamma + 2 + 1/\Gamma)$$

Therefore, the level meter 26 indicates the value Z, which then shows the ratio $D/U = <E_1^2>/<E_2^2>$ by plotting the scale of the meter 26 properly.

Figure 9:
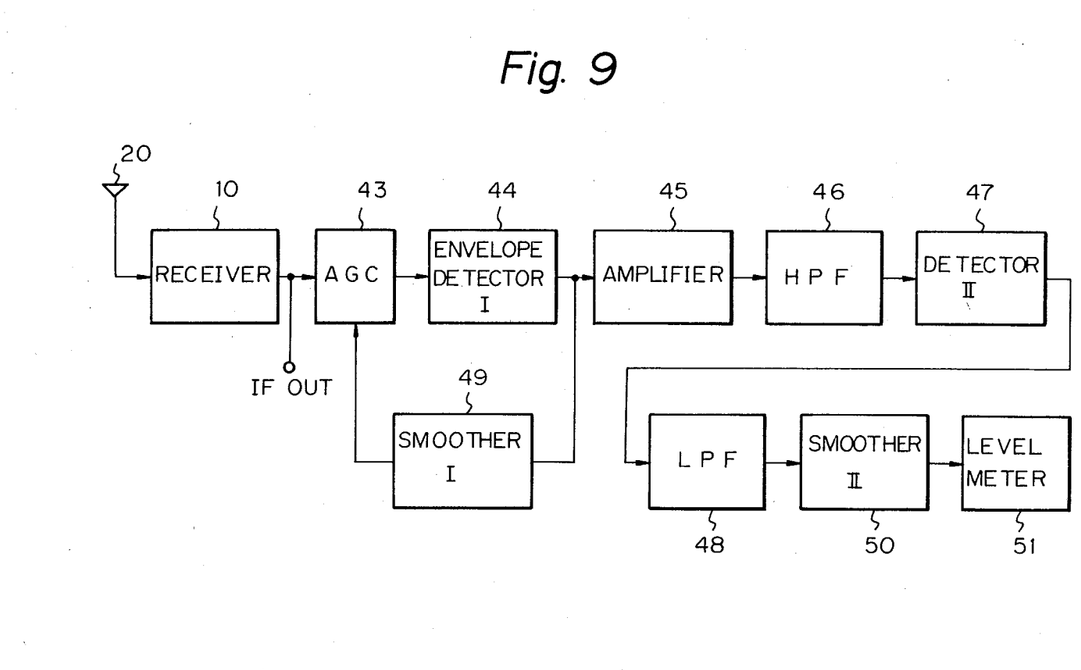
FIG. 9 is a block diagram of still another embodiment of the interference detection system according to the present invention.
Figure 10:
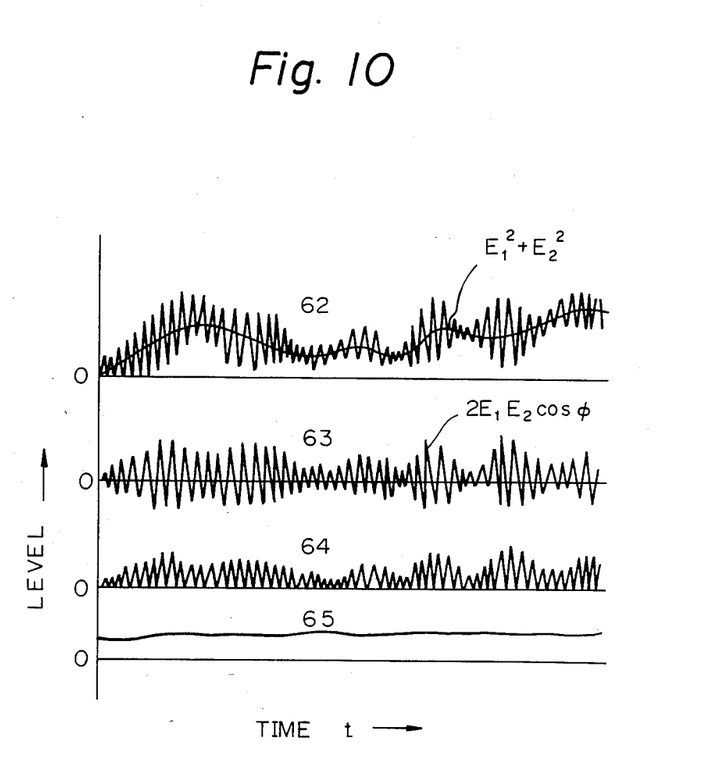
FIG. 10 shows waveforms of the apparatus of FIG. 9.

FIG. 9 shows still another embodiment of the present invention, in which the reference numeral 20 is an antenna, 10 is a receiver, 43 is an AGC (Automatic Gain Control) circuit, 44 is an envelope detector, 45 is an amplifier, 46 is a high-pass filter, 47 is a detector, 48 is a low-pass filter, 49 is a smoother circuit, 50 is another smoother circuit, and 51 is a level meter. FIG. 10 shows the waveforms of the apparatus of FIG. 9, and 62 is the waveform of the output of the detector 44, 63 is the waveform of the high-pass filter 46, 64 is the waveform of the detector 47, and 65 is the waveform of the smoother circuit 50.

In FIG. 9, both the desired signal D and the undesired signal U are applied to the receiver 10 through the antenna 20. The intermediate frequency output IF$_{OUT}$ of the receiver 10 is applied to the envelope detector 44 through the AGC amplifier 43. The time constant of the loop circuits of 43, 44 and 49 is very large so that that loop circuit removes only the variation of the median value level which is usually 0.1–1.0 Hz. The output of the envelope detector 44 is shown in the equation (6) and the waveform 62 in FIG. 10. The output of the detector 44 is applied to the high-pass filter 46 through the amplifier 45. The high-pass filter 46 removes the low frequency component ($E_1^2 + E_2^2$), and then the output of the high-pass filter 46 is the waveform 63 of FIG. 10. The waveform 63 is processed by the envelope detector 47 and the low-pass filter 48, then, the product of the desired signal $E_1$ and the undesired signal $E_2$ is obtained as shown in the following formula.

$$Y'' = 2E_1E_2$$

The value Y'' is an instantaneous value and varies by fading. Therefore, the waveform is processed as shown by the waveform 65 in FIG. 10 by the smoother 50, and the square root of the square average of Y'' is indicated by the level meter 51. The indicated value W by the meter 51 is;

$$W = 2(<E_1^2><E_2^2>)^{\frac{1}{2}} \quad (26)$$

On the other hand, the value $X(=<E_1^2> + <E_2^2>)$ is constant because of the presence of the AGC circuit 43.

$$X = <E_1^2> + <E_2^2> = C \text{ (constant)} \quad (27)$$

The following equation is derived from equations (26) and (27).

$$W = 2C\sqrt{(\Gamma)} /((\Gamma) + 1), \text{ where } (\Gamma) = <E_1^2>/<E_2^2> \quad (28)$$

Therefore, the D/U ratio ($=\Gamma$) is measured by properly plotting $\Gamma$ on the meter 51.

Figure 11:
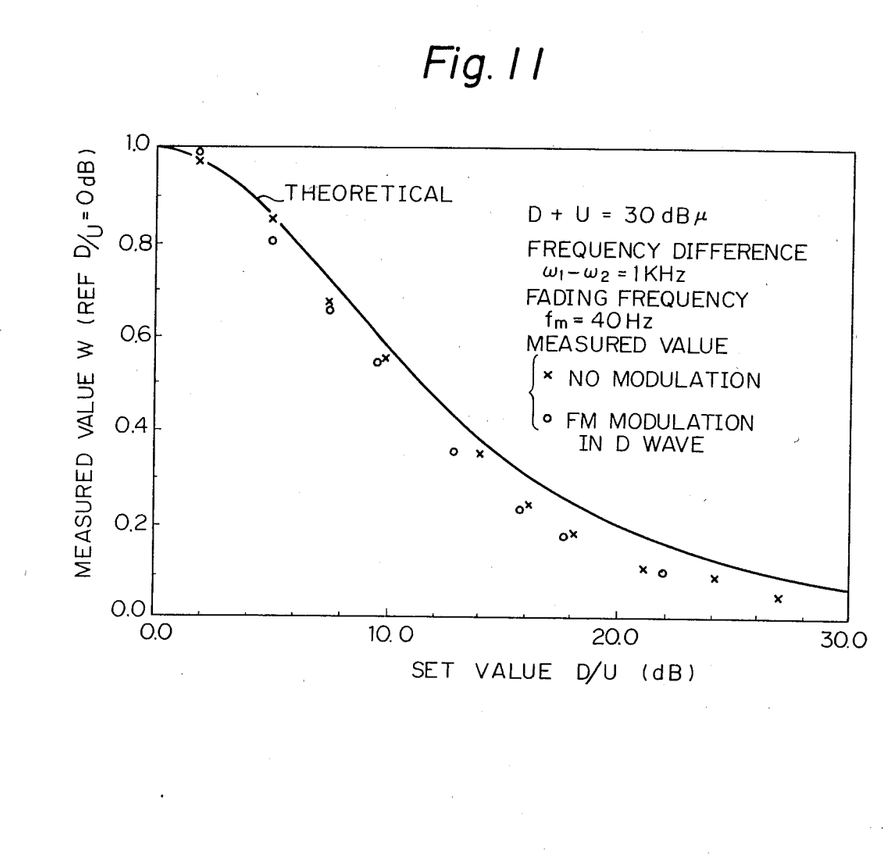
FIG. 11 shows the experimental result of the apparatus of FIG. 9.

FIG. 11 shows the experimental curve of the apparatus of FIG. 9. In FIG. 11, the horizontal axis shows the set value D/U ratio, and the vertical axis shows the measured value W, and the solid line shows the theoretical curve, and the dots show the measured value. The measured value coincides well with the theoretical solid curve.

It should be appreciated of course that some modifications of the present invention are possible to those skilled in the art within the spirit of the present invention. For instance, an envelope detection may be not only a square detection, but also a 4'th order detection, or any order detection.

It may be advantageous to provide a pilot signal outside of the signal band for the easy detection of the beat between the desired signal and the undesired signal. That pilot signal is preferably modulated in angular modulation. Alternatively, the carrier frequency of the first transmitter may be a little different from that of the second transmitter so that the beat frequency between the two carriers is easily detected.

As described above in detail, the present invention detects a cochannel interference very easily, and can be used for instance in a mobile communication, or cordless telephone.

From the foregoing, it will now be apparent that a new and improved cochannel interference detection system has been found. It should be understood of course that the embodiments disclosed are merely illustrative and are not intended to limit the scope of the invention. Reference should be made to the appended claims, therefore, rather than the specification as indicating the scope of the invention.

We claim:

1. A cochannel interference measurement system for use in radio communications using angular modulation and coupled to a radio receiver, said system comprising:

a linear envelope detection means coupled to said radio receiver for detecting both a first desired signal and a second undesired signal through linear envelope detection;

low frequency spectrum component detection means coupled to said envelope detection means for detecting a low frequency spectrum component having a spectrum component frequency approximate in value to that of a fading frequency $f_m$ of said desired or undesired signal, wherein $f_m = V$(velocity of a medium in which said radio receiver is located)/ $\omega$(wavelength of said desired or undesired communication signal), and said low frequency component being related to the sum of said first signal and said second signal;

high frequency spectrum component detection means coupled to said envelope detection means for detecting a high frequency spectrum component of a frequency higher than said fading frequency, said high frequency component being related to the product of said first signal and said second signal;

means for providing a ratio of said low frequency spectrum component to said high frequency spectrum component; and means coupled to said ratio providing means for indicating an amount of interference ratio of said first signal to said second signal in accordance with said ratio of said low frequency spectrum component to said high frequency spectrum component.

2. A cochannel interference measurement system according to claim 1, wherein said low frequency component detection means comprises a smoother circuit which blocks said high frequency component, and said high frequency component detection means comprises a delay circuit in order to delay an envelope detection output, a differential circuit for providing a difference between an output of said delay circuit and output of the envelope detection means, and a squaring circuit coupled with output of said differential circuit.

3. A cochannel interference measurement system for use in radio communications using angular modulation and coupled to a radio receiver, said system comprising:

a linear envelope detection means coupled to said radio receiver for detecting both a first desired signal and a second undesired signal through linear envelope detection;

low frequency spectrum component detection means coupled to said envelope detection means for detecting a low frequency spectrum component having a spectrum component frequency approximate in value to that of a fading frequency $f_m$ of said desired or undesired signal, wherein $f_m = V$(velocity of a medium in which said ratio receiver is located)//$\omega$(wavelength of said desired or undesired communication signal), said low frequency component being related the sum of said first signal and said second signal and providing a detection output signal;

high frequency spectrum component detection means coupled to said envelope detection means for detecting a high frequency spectrum component of a frequency higher than said fading frequency, said high frequency component being related to the product of said first signal and said second signal;

means coupled to said high frequency spectrum component detection means for indicating an amount of interference ratio of said first signal to said second signal in accordance with a ratio of said low frequency spectrum component to said high frequency spectrum component, and wherein said envelope detection means includes an automatic gain control circuit responsive to said detection output signal provide gain control to said first and second signals and said high frequency component detection means includes a high pass filter and detector cascade coupled to said envelope detection means.

4. A cochannel interference measurement system in radio communications using angular modulation comprising:

envelope detection means for envelope detection of all cochannel reception signals;

a first sampling means for sampling the output level of said envelope detection means at time $t_i$ with a predetermined period to provide first sampled value $R_i(t)$;

a second sampling means for sampling output level of said envelope detection means at time $t_i + \Delta t$ with said predetermined period to provide second sampled value $(R_i(t+\Delta t))$;

means for providing a low frequency component of the envelope detected output by providing an average X of a plurality of first sampled levels $(R_i(t))$ for $i = 1$ to n and for providing a high frequency component of the envelope detected output by providing an average Y of the square of the difference between said first sampled levels $(R_i(t))$ an said second sampled levels $(R_i(t+\Delta t))$ for $i = 1$ to n;

means for providing an amount of interference according to ratio $X^2/Y$ of $X^2$ of said low frequency component and Y of said high frequency component;

said value $\Delta t$ being selected in the range between a minimum value in which the average of the product of high frequency spectrum components of $R_i(t)$ and $R_i(t+\Delta t)$ satisfies a condition $<\cos(\psi\text{-})\cos(\psi\Delta)> \approx 0$, and a maximum value in which low frequency spectrum components of $R_i(t)$ and $R_i(t+\Delta t)$ satisfies conditions $E_1 \approx E_{1\Delta}$, and $E_2 \approx E_{2\Delta}$, and wherein $\psi = (\omega_2 - \omega_1)t + 0 + ((\Delta\omega_2)/P_2)$ sin $(P_2 t + 0) - ((\Delta\omega_1)/P_1)$ sin $P_1 t$, and $\psi\Delta$ is derived by substituting "t" with "t+$\Delta$t", $E_1 (=E_1(t))$ is the amplitude of the desired signal at time t, $E_{1\Delta} (=E_1(t+\Delta t))$ is the amplitude of the desired signal at time t+$\Delta$t, $E_2 (=E_2(t))$ is the amplitude of the undesired signal at time t, and $E_{2\Delta} (=E_2(t+\Delta t))$ is the amplitude of the undesired signal at time t+$\Delta$t.

5. A cochannel interference measurement system according to claim 4, wherein said reception signals are angular-modulated by a pilot signal outside of a signal band for generating a beat for interference detection.

6. A cochannel interference measurement system according to claim 4, wherein one of said reception signals is slightly different in frequency from the other reception signal for providing a beat for interference measurement.

* * * * *